United States Patent
Esmoris Bertoa et al.

(10) Patent No.: US 11,881,760 B2
(45) Date of Patent: Jan. 23, 2024

(54) ON-BOARD CHARGERS (OBC)

(71) Applicant: Mahle International GmbH, Stuttgart (DE)

(72) Inventors: Anton Esmoris Bertoa, Valencia (ES); Donato Jordan Herrero, La Yesa (ES)

(73) Assignee: Mahle International GmbH

( * ) Notice: Subject to any disclaimer, the term of this patent is extended or adjusted under 35 U.S.C. 154(b) by 25 days.

(21) Appl. No.: 17/290,249

(22) PCT Filed: Oct. 17, 2019

(86) PCT No.: PCT/EP2019/078225
§ 371 (c)(1),
(2) Date: Apr. 29, 2021

(87) PCT Pub. No.: WO2020/088945
PCT Pub. Date: May 7, 2020

(65) Prior Publication Data
US 2022/0021293 A1    Jan. 20, 2022

(30) Foreign Application Priority Data
Oct. 30, 2018 (EP) .................................... 18382761

(51) Int. Cl.
*H02M 1/10* (2006.01)
*B60L 53/20* (2019.01)
(Continued)

(52) U.S. Cl.
CPC .............. *H02M 1/10* (2013.01); *B60L 53/20* (2019.02); *H02M 1/0085* (2021.05);
(Continued)

(58) Field of Classification Search
CPC .... H02M 1/10; H02M 1/4216; H02M 1/4225; H02M 1/4233; H02M 1/0085;
(Continued)

(56) References Cited

U.S. PATENT DOCUMENTS

| 5,200,887 A | * | 4/1993 | Ioroi | ...................... H02M 1/10 323/299 |
| 8,503,208 B2 | * | 8/2013 | Krause | ................ H02M 5/4585 363/127 |

(Continued)

FOREIGN PATENT DOCUMENTS

| CN | 107947309 A | 4/2018 | |
| CN | 109861357 A | * 6/2019 | .............. H02J 7/045 |

(Continued)

OTHER PUBLICATIONS

Sakr Nadim et al. "A New Combined Bidirectional Boost Converter and Battery Charger for Electric Vehicles" IECON 2015, 41st Annual Conference of the IEEE, Nov. 9, 2015, pp. 1258-1263.

(Continued)

*Primary Examiner* — Fred E Finch, III
(74) *Attorney, Agent, or Firm* — Fishman Stewart PLLC

(57) ABSTRACT

An on-board charger (OBC) may include a power factor corrector PFC comprising a three phase active front end (AFE) connected to an AC electrical grid, and a DC/DC converter receiving a regulated DC voltage from the PFC and configured to charge a high voltage battery. The OBC may be configured to extract a power value which is equal to a reference maximum power extracted from a three phase electrical grid $P_{MAX3\phi}$ from any type of AC electrical grid to which the OBC is connected, and may include three switches SW1, SW2 and SW3 and a diodes arm having diodes D1 and D2 connected in series between a high and low side of the AFE, whereby two switches SW1 and SW2 are arranged between the AFE and the AC electrical grid and are able to interrupt current flowing between phase arms of the three phase AFE, wherein the third switch SW3 is arranged on a line connecting the diodes arm and the AC electrical grid.

9 Claims, 9 Drawing Sheets

(51) Int. Cl.
*H02M 1/42* (2007.01)
*H02M 1/00* (2006.01)

(52) U.S. Cl.
CPC ........ *H02M 1/4216* (2013.01); *H02M 1/4225* (2013.01); *H02M 1/4233* (2013.01)

(58) Field of Classification Search
CPC ...... H02M 3/1584; B60L 53/20; Y02B 70/10; Y02T 10/92; H02J 7/02; H02J 2207/20; H02J 2310/48
See application file for complete search history.

(56) References Cited

U.S. PATENT DOCUMENTS

| | | | |
|---|---|---|---|
| 10,587,205 | B2 | 3/2020 | Tazaki |
| 11,114,883 | B2 | 9/2021 | Vela Garcia |
| 2010/0237694 | A1* | 9/2010 | Fuma ...................... B60L 53/14 307/9.1 |
| 2011/0149622 | A1 | 6/2011 | Lin |
| 2011/0261591 | A1* | 10/2011 | Krause ................. H02M 7/219 363/17 |
| 2014/0028099 | A1* | 1/2014 | Van Kalken ............ H02J 9/061 307/64 |
| 2015/0239358 | A1* | 8/2015 | Ripoll ..................... B60L 53/00 320/109 |
| 2015/0280548 | A1 | 10/2015 | Shoyama et al. |
| 2018/0041061 | A1* | 2/2018 | McLaughlin ........... H02M 1/10 |
| 2019/0074775 | A1* | 3/2019 | Chimento ......... H02M 3/33573 |
| 2019/0089182 | A1* | 3/2019 | Sun ...................... H02M 1/10 |
| 2019/0089241 | A1* | 3/2019 | Opila ...................... H02M 7/02 |
| 2019/0168628 | A1* | 6/2019 | Pfeilschifter ............. B60L 1/00 |
| 2019/0288539 | A1* | 9/2019 | Vela Garcia .......... H02M 7/487 |
| 2019/0312509 | A1* | 10/2019 | Kim ....................... H02M 7/23 |
| 2020/0083727 | A1* | 3/2020 | Sun ........................... H02J 7/00 |
| 2021/0384815 | A1* | 12/2021 | Kolar ..................... H02M 1/40 |

FOREIGN PATENT DOCUMENTS

| | | | | |
|---|---|---|---|---|
| DE | 102011075927 | A1 * | 11/2012 | ............. B60L 53/22 |
| FR | 3061819 | A1 * | 7/2018 | .......... H02M 1/4216 |
| JP | H05096372 | A | 4/1993 | |
| JP | 2013150371 | A | 8/2013 | |
| WO | 2017159078 | A1 | 9/2017 | |
| WO | 2018109103 | A1 | 6/2018 | |

OTHER PUBLICATIONS

Opila Daniel F et al: "A reconfigurable three- and single-phase AC/DC non isolated bi-directional converter for multiple worldwide voltages", 2017 IEEE Energy Conversion Congress and Exposition (ECCE), IEEE, Oct. 1, 2017 (Oct. 1, 2017), pp. 1708-1714.
European Office Action dated Oct. 11, 2022 for European Patent Application No. 19 786 363.2.
Japanese Notice of Reasons for Refusal dated Jul. 25, 2023 for Japanese Patent Application No. 2021-514363.

* cited by examiner

ON-BOARD CHARGERS (OBC)

CROSS-REFERENCE TO RELATED APPLICATIONS

This application claims priority to International Patent Application No. PCT/EP2019/078225, filed on Oct. 17, 2019, and European Patent Application No. 18382761.7, filed on Oct. 30, 2018, the contents of both of which are hereby incorporated by reference in their entirety.

TECHNICAL FIELD

The present invention relates to OBC's configured to be connected to any type of AC power source and that comprise means that permit extracting a maximum power in single phase, two phase and split-phase grids equal to the maximum power in three phase electrical grids.

BACKGROUND

Power conversion systems as on-board chargers (OBC) are used to provide an AC input power to a DC load. OBC's can be used e.g. in motor drives with an inverter stage driving an AC motor. An OBC may convert the grid 50/60 Hz to DC power, adjust the DC voltage to the levels required by the high voltage battery, provide galvanic isolation, power factor correction (PFC) and control to prevent damage by arcs caused by hot unplugging.

OBC's are typically connected to the electrical grid through a PFC converter that assures a power factor PF close to unity while limiting the Total Harmonic Distortion (THD) of the input current below certain limits. In most cases, customers require that the PFC works in single, split and three phase grids. Typically only a third of the total power can be delivered in single/split phase configuration. However, it may be required that the full power is provided in all of the configurations, which would require an alternative circuit topology that allows for both, meeting the power requirements while assuring a high power density figures.

Conventionally, single phase PFC stage converters may be based on a single phase bridge rectifier followed by a boost converter. The output of the boost converter may be a regulated DC voltage that ensures the correct operation of a DC/DC converter i.e. a battery charger to charge a high voltage DC battery.

The single phase topology already described can be replicated to achieve a three phase PFC stage based on a single phase boost PFC converter per phase. This architecture is a good choice when there is already a previous single phase design, because it reduces the time to market. However, the number of components and power density may not be optimized compared to other architectures. Disadvantageously, the three phase PFC stage based on a single phase bridge rectifier and a boost converter per phase does not optimize the number of components. Therefore the power density of the OBC input stage may be compromised.

Other current implementations may include a 1 phase boost PFC stage based on paralleling single phase boost PFC stages, wherein each of the single phase PFC stages could potentially be connected in parallel to a single phase power source, or a three phase OBC or single phase OBC based on a three phase AFE that substitutes the previously described bridge rectifier followed by a boost converter. The AFE allows for a reduced number of components and a higher power density. Disadvantageously, the three phase PFC stage based on the three phase AFE limits the maximum current that can be extracted from the electrical grid to that of a single phase, therefore the maximum power in the single phase mode of operation is ⅓ of the maximum power in three phase mode of operation.

Active front end (AFE) converters used in OBC's for power factor correction employ an active switching rectifier to convert input AC power to provide DC power to a bus, followed by an inverter that drives a transformer in order to pass the energy with galvanic isolation from the output of the power factor corrector to the OBC's output. The secondary currents of the isolation transformer are rectified to drive the DC load. Such active front end converters are typically coupled with input filters, such as LCL filter circuits connected to each power phase. Since the front end rectifier is a switching circuit, the input filter operates to prevent introduction of unwanted harmonic content into the power grid or other input source. Filter components, including the filter inductors, are typically designed according to the power converter rating, where oversizing input filter components adds cost to the system and occupies valuable enclosure space. However, situations may occur in which grid voltages sag, or in which an available input source voltage is lower than the nominal AC input voltage for which the converter was designed.

Therefore, obtaining an OBC input stage architecture that overcomes the aforementioned drawbacks of the current OBC configurations, that permits operating the OBC in single, split and three phase electrical grid, ensuring a power factor (PF) close to unity and a low THDi and achieving a high power density while using the minimum number of components is desired. Furthermore, an OBC that extracts the same total power that can be extracted from a three phase grid in single, two phase and split-phase electrical grids (thus, avoiding the single phase ⅓ limit imposed by the AFE architectures previously mentioned) is also desired.

SUMMARY

The present invention proposes an architecture for an OBC that solves the aforementioned drawbacks, e.g. it avoids the single phase ⅓ limit imposed by the AFE architectures, it allows the OBC to be compatible with single, two, split and three phase electrical networks, it ensures a PF close to unity and a low THDi. Furthermore, the power density of the proposed OBC can be comparable to a standard three phase electrical network AFE and the number of components is optimized compared to state of the art solutions previously mentioned based on paralleling single phase PFC stages.

Hence, in a main aspect of the present invention, it is proposed a method for extracting a power value which is equal to a reference maximum power extracted from a three phase electrical grid $P_{MAX3\phi}$ from an AC electrical grid with an on-board charger, OBC that comprises a power factor corrector, PFC having a three phase active front end, AFE connected to the AC electrical grid, a DC/DC converter receiving a regulated DC voltage from the PFC and configured to charge a high voltage battery and means that configures the OBC to extract the power value, the means comprises three switches SW1, SW2 and SW3 and a diodes arm having diodes D1 and D2 connected in series between a high and low side of the AFE, whereby the two switches SW1 and SW2 are arranged between the AFE and the AC electrical grid and can interrupt current flowing between phase arms of the three phase AFE, wherein the third switch SW3 is arranged on a line connecting the diodes arm to the AC electrical grid. The method comprises extracting the power value by actuating the three switches SW1, SW2 and SW3 in an open state, in response to the PFC connected to a three phase electrical grid, so that the switches SW1 and SW2 interrupt current flowing between the phase arms of the three phase AFE, wherein the third switch SW3 interrupts current flowing between the three phase electrical grid and the diodes arm, so that the three switches SW1 SW2 and SW3 and the diodes arm do not conduct current.

Alternatively, the method comprises the step of extracting the power value by actuating the three switches SW1, SW2 and SW3 in a closed state in response to the PFC connected to a single phase electrical grid, wherein the diodes arm conducts current so that the switches SW1 and SW2 allow current to flow between the phase arms of the three phase AFE, wherein the third switch SW3 is closed to allow current to flow between the single phase electrical grid and the diodes arm.

Alternatively, the method comprises the step of extracting the power value by actuating the three switches SW1, SW2 and SW3 in an closed state in response to the PFC connected to a split-phase or a two phase electrical grid, so that the switches SW1 and SW2 allow current to flow between the phase arms of the three phase AFE, wherein the third switch SW3 is closed to allow current to flow between the diodes arm and one line of the split-phase or the two phase electrical grid.

Hence, in a another aspect of the present invention, it is proposed a method for extracting a power value from an AC electrical grid with an on-board charger, OBC that comprises a power factor corrector, PFC having a three phase active front end, AFE connected to the AC electrical grid, a DC/DC converter receiving a regulated DC voltage from the PFC and configured to charge a high voltage battery and a switch SW2 arranged between the AFE and the AC electrical grid and can interrupt current flowing between two phase arms of the three phase AFE. The method comprises extracting a power value equal to a reference maximum power extracted from a three phase electrical grid $P_{MAX3\emptyset}$ by actuating the switch SW2 in an open state in response to the PFC connected to the three phase electrical grid so that the switch SW2 interrupts current flowing between the two phase arms of the three phase AFE.

Alternatively, the method comprises the step of extracting the power value equal to a reference ⅔ $P_{MAX3\emptyset}$ by actuating the switch SW2 in a closed state in response to the PFC being connected to a single phase electrical grid so that the switch SW2 allows current to flow between the two phase arms of the three phase AFE, wherein a third phase arm of the AFE withstands a maximum value of the line current $I_{MAX}$ and the two phase arms of the three phase AFE withstand a value of the line current equal to ½ $I_{MAX}$.

Alternatively, the method comprises the step of extracting the power equal to a reference ⅔ $P_{MAX3\emptyset}$ by actuating the switch SW2 in a closed state in response to the to the PFC being connected to a split-phase or a two phase electrical grid so that the switch SW2 allows current to flow between the two phase arms of the three phase AFE, wherein a third phase arm of the three phase AFE withstands a maximum value of the line current $I_{MAX}$ and the two phase arms of the AFE withstand a value of the line current equal to ½ $I_{MAX}$.

In another main aspect of the present invention, it is proposed an on-board charger, OBC that comprises a power factor corrector, PFC comprising a three phase active front end, AFE connected to an AC electrical grid, a DC/DC converter receiving a regulated DC voltage from the PFC and configured to charge a high voltage battery. The OBC comprises means that configure the OBC to extract a power value which is equal to a reference maximum power extracted from a three phase electrical grid $P_{MAX3\emptyset}$ from any type of AC electrical grid to which the OBC is connected, the means comprising three switches SW1, SW2 and SW3 and a diodes arm having diodes D1 and D2 connected in series between a high and low side of the AFE. Furthermore, the two switches SW1 and SW2 are arranged between the AFE and the AC electrical grid and can interrupt current flowing between phase arms of the three phase AFE, wherein the third switch SW3 is arranged on a line connecting the diodes arm and the AC electrical grid.

In some examples, the OBC further comprises an EMI filter established between the electrical grid and the three phase AFE.

In another main aspect of the present invention, it is proposed an on-board charger OBC, that comprises a power factor corrector, PFC comprising a three phase active front end, AFE connected to an AC electrical grid, a DC/DC converter receiving a regulated DC voltage from the PFC and configured to charge a high voltage battery. The OBC further comprises a switch SW2 arranged between the AFE and the AC electrical grid that can interrupt current flowing between two phase arms of the three phase AFE. The power value is equal to a reference maximum power extracted from a three phase electrical grid, $P_{MAX3\emptyset}$, when the AC grid is a three phase electrical grid by actuating the switch SW2 in an open state in response to the PFC connected to the three phase electrical grid so that the switch SW2 interrupts current flowing between the two phase arms of the three phase AFE.

Alternatively, the power value is equal to a reference ⅔ $P_{MAX3\emptyset}$ when the AC grid is a single phase, a two phase or a split-phase electrical grid so that the switch SW2 allows current to flow between the two phase arms of the three phase AFE, wherein a third phase arm of the three phase AFE withstands a maximum value of the line current $I_{MAX}$ and the two phase arms of the AFE withstand a value of the line current equal to ½ $I_{MAX}$.

BRIEF DESCRIPTION OF THE DRAWINGS

For a better understanding the above explanation and for the sole purpose of providing an example, some non-limiting drawings are included that schematically depict a practical embodiment.

DETAILED DESCRIPTION

Figure 1:
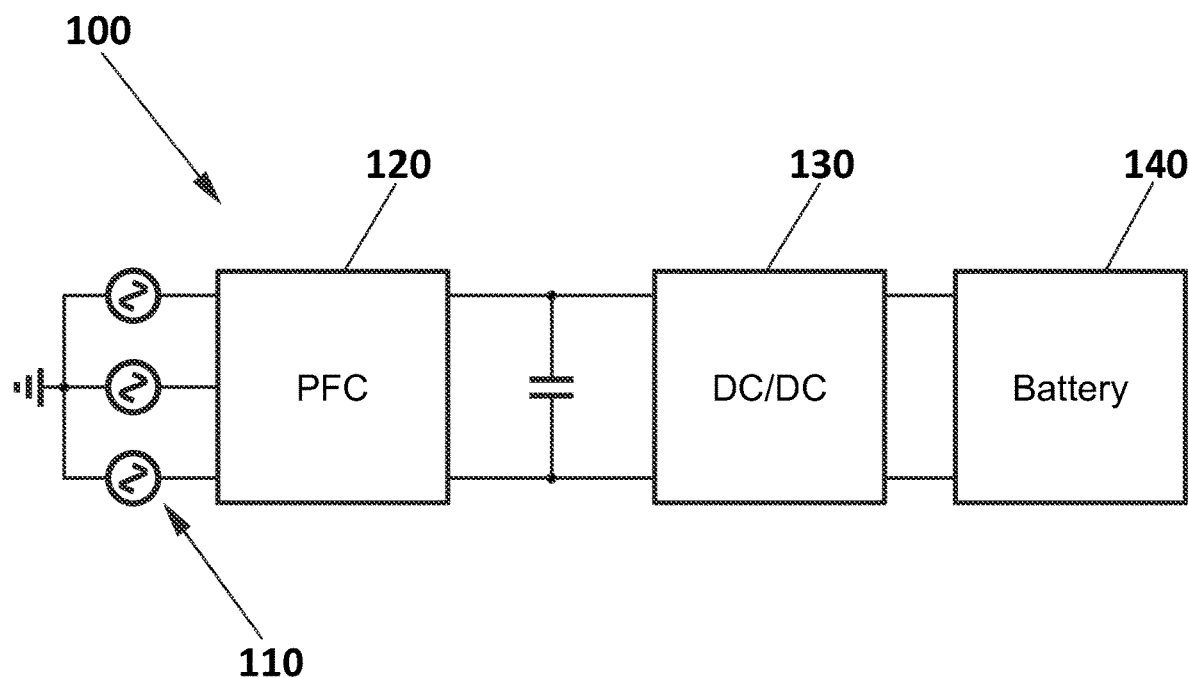
FIG. 1 shows a conventional charging control system of an OBC.

FIG. 1 is a diagram illustrating a conventional charging control system of an OBC (100). Conventionally, these charging control systems have a structure in which an alternating current (AC) power of a single, split and three phase grid may be converted into DC power and supplied as an input power source and stored in a DC power source as energy through a power factor corrector (PFC) stage (120), and a DC-DC converter (130). FIG. 1 shows an OBC (100) with a three phase PFC stage (120) for a three phase electrical grid (110).

During slow charging, the OBC (100) may be configured to rectify and boost an input power source (e.g., an external AC power source) and convert the AC power source into a DC power source to charge a high-voltage battery (140). The OBC may include the DC-DC converter (130) (power converter) configured to perform a high-frequency switching on/off operation. Input/output voltage control of the PFC (120) may be performed by adjusting a duty ratio of a switching module of the PFC (120) and thus, the magnitude of an output voltage of the PFC (120) applied to the DC-DC converter (130) may be adjusted.

Hence, the DC-DC converter (130) can be configured to adjust an output voltage and current to perform charging according to a voltage and current required in the high-voltage battery. The DC-DC converter (130) may use an output voltage of the PFC (120) as an input voltage and may be configured to adjust an output voltage and current of the OBC (100) by performing frequency and phase shifting adjustment.

The PFC (120) is a PF corrector and may be configured to reduce power loss generated in a process of changing an AC power source into a DC power source. The PFC (120) may be configured to increase power transmission efficiency by cancelling a phase difference between a voltage and a current of the AC power source using an impedance matching circuit. The PFC (120) may include a switching module configured to equalize the AC power source through pulse width modulation (PWM) control.

As previously mentioned, only a third of the total power for three phase grids can be delivered in single/split phase in a conventional OBC configuration as shown in FIG. 1, according to:

$$P_{MAX3\varnothing}=3 \cdot V_{pn} \text{ (rms)} \cdot I_p \text{ (rms)}$$

$$P_{MAX1\varnothing}=V_{pn} \text{ (rms)} \cdot I_p \text{ (rms)}$$

In an example, provided that the phase to neutral grid voltage is $230V_{rms}$ and the maximum required line current is $16 A_{rms}$, the maximum power that can be extracted from the grid for the three phase network is $P_{MAX3\varnothing}=11$ kW and the maximum power that can be extracted for the single phase is $P_{MAX1\varnothing}=3.7$ kW.

Figure 2:
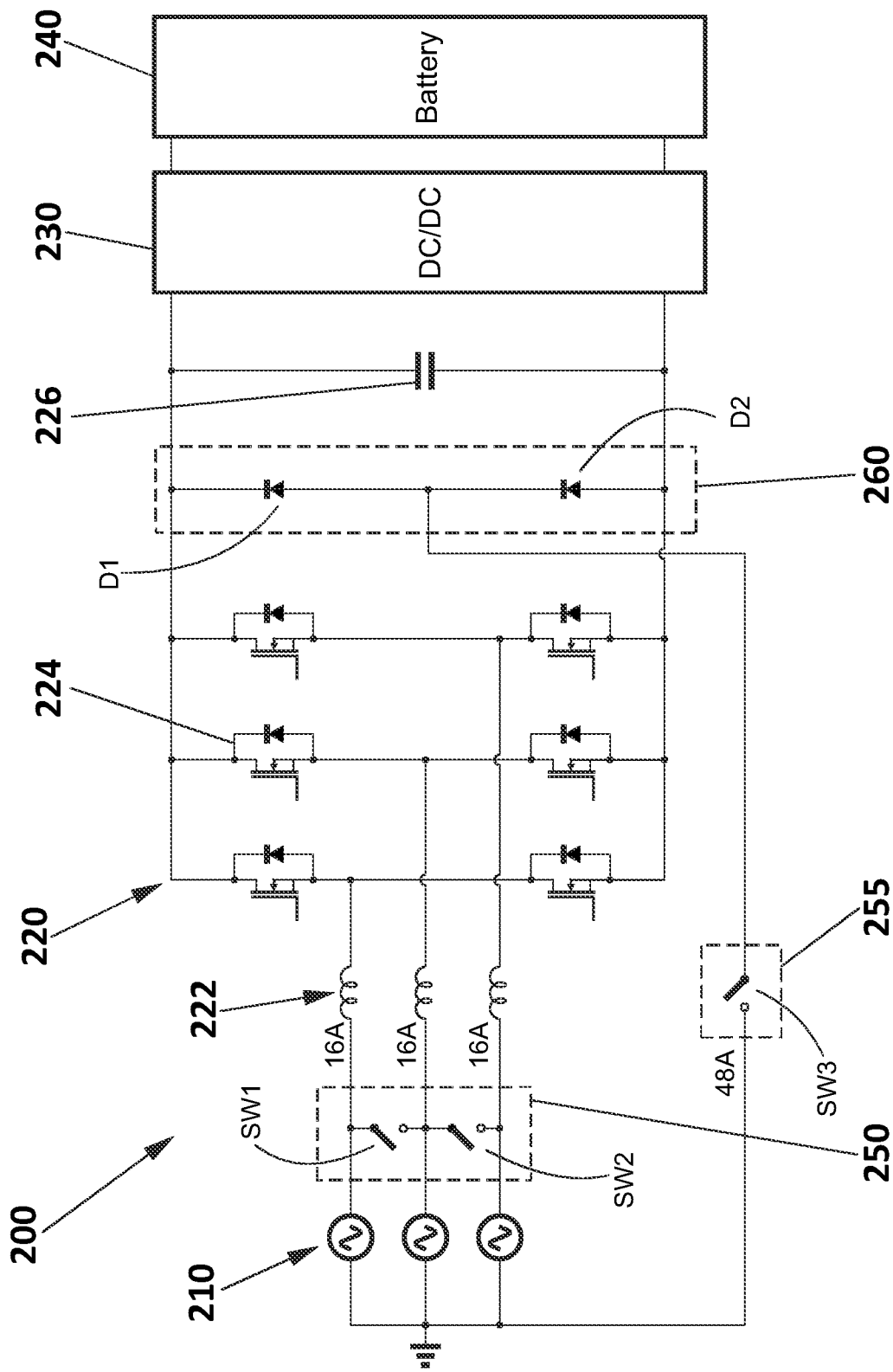
FIG. 2 shows an example of an OBC connected to a three phase electrical grid according to the present disclosure.

FIG. 2 shows an example of a charging control system with a proposed OBC (200) for a three phase electrical grid (210) according to the present disclosure. The proposed OBC (200) comprises a three phase AFE (220) performing as a PFC converter and a charger DC-DC converter (230) supplying DC power to a high voltage battery (240).

The AFE (220) includes switching modules (224) configured to equalize the three phase electrical grid (210) through pulse width modulation (PWM) control. The charging system comprises input inductances (222) for each phase of the three phase grid source and a capacitor (226) to prevent introduction of unwanted harmonic content.

The proposed OBC (200) further comprises means that permit the OBC (200) to extract the maximum power $P_{MAX3\varnothing}$ from the grid independently of the type of electrical grid to which the OBC is connected, i.e. the switches SW1, SW2 signalled with reference (250) and switch SW3 signalled with reference (255), as well as the diodes D1 and D2 signalled with reference (260), as shown in FIG. 2. The diodes D1 and D2 are connected in series between a high and low side of the AFE (220), whereby the two switches SW1 and SW2 are arranged between the AFE (220) and the AC electrical grid and can interrupt current flowing between phase arms of the three phase AFE (220), wherein the third switch SW3 is arranged on a line connecting the diodes arm (260) to the AC electrical grid. There are three modes of operation of the OBC, depending upon whether the AFE (220) of the OBC (200) is connected to a three, two, single or split phase electrical grid. FIG. 2 shows the mode of operation for connection to a three phase electrical grid (210).

The mode of operation of the OBC (200) for a connection to a three phase electrical grid is the following: While the OBC (200) is connected to a three phase electrical grid, the switches SW1, SW2 and SW3 are permanently opened as shown in FIG. 2 and the stage for PFC behaves as a regular three phase AFE. In this mode of operation, the diodes D1 and D2 do not conduct current. In a practical example, provided that the phase to neutral grid effective voltage is $230V_{rms}$, the maximum power that can be extracted from the grid is $P_{MAX3\varnothing}=11$ kW (assuming that the PF=1 and a maximum line current of $16 A_{rms}$ per phase). In this example, the three phase AFE can be controlled by means of a Pulse Width Modulation strategy. In another example, the switch SW3 is not comprised in the OBC (200). In another example, the OBC (200) extracts power from a two phase electrical grid.

Figure 3:
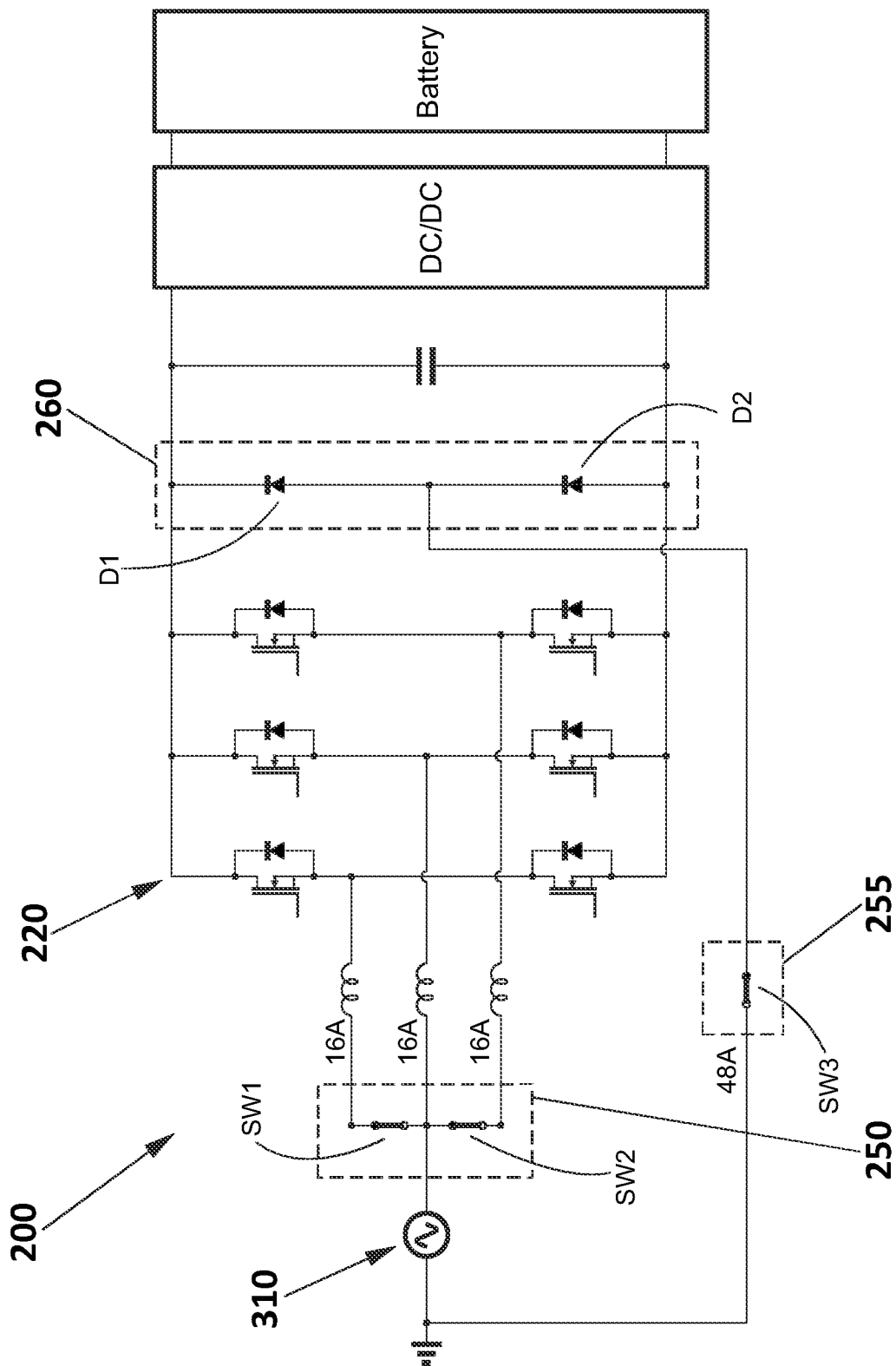
FIG. 3 shows the proposed OBC connected to a single phase electrical grid according to the present disclosure.

FIG. 3 shows the proposed OBC (200) according to the present disclosure connected to a single phase electrical grid (310). FIG. 3 shows the OBC (200) comprising the AFE (220) as PFC converter and a charger DC-DC converter (220) supplying DC power to a high voltage battery. As previously mentioned, the proposed OBC (200) comprises the switches SW1, SW2 signalled with reference (250) and switch SW3 signalled with reference (255), as well as the diodes D1 and D2 signalled with reference (260). FIG. 3 shows the mode of operation for a single phase electrical grid (310).

While the OBC (200) is connected to the single phase electrical grid (310), the switches SW2, SW2 and SW3 are permanently closed. In this mode of operation, the three phase arms work in parallel with each other, sharing each arm ⅓ of the total line current $I_{rms}$ and the diodes D1 and D2 conduct current, forming a topology known as Totem-Pole rectifier. Hence, the power components can be rated to $\frac{1}{3}I_{rms}$ for single, two, split or three phase operation. As it is shown in FIG. 3, the single phase electrical grid (310) is connected via the switch SW3 to the diodes arm and between the diodes D1 and D2. For this example, provided that the phase to neutral grid voltage $V_{rms}=230V_{rms}$, and the total line current $I_{rms}=48$ A and the current for each arm is equal to 16 $A_{rms}$, the maximum power that can be extracted from the grid is $P_{MAX1\varnothing}=P_{MAX3\varnothing}=11$ kW (assuming that the PF=1). The diodes and the SW3 must be dimensioned to withstand three times (3×) the line current (e.g. 48 $A_{rms}$ in this example). D1 and D2 are low frequency (line frequency) diodes, therefore their cost can be limited.

In this example, each of the three phase arms of the AFE (220) can be controlled by means of a Pulse Width Modulation strategy. The arms can share the control signals, or a different modulation strategy like e.g. interleaving, which could be used to further increase the power density of the PFC converter. This can be achieved e.g. by means of reduction of electromagnetic interference EMI filtering and boost inductors due to high frequency harmonics reduction.

Figure 4:
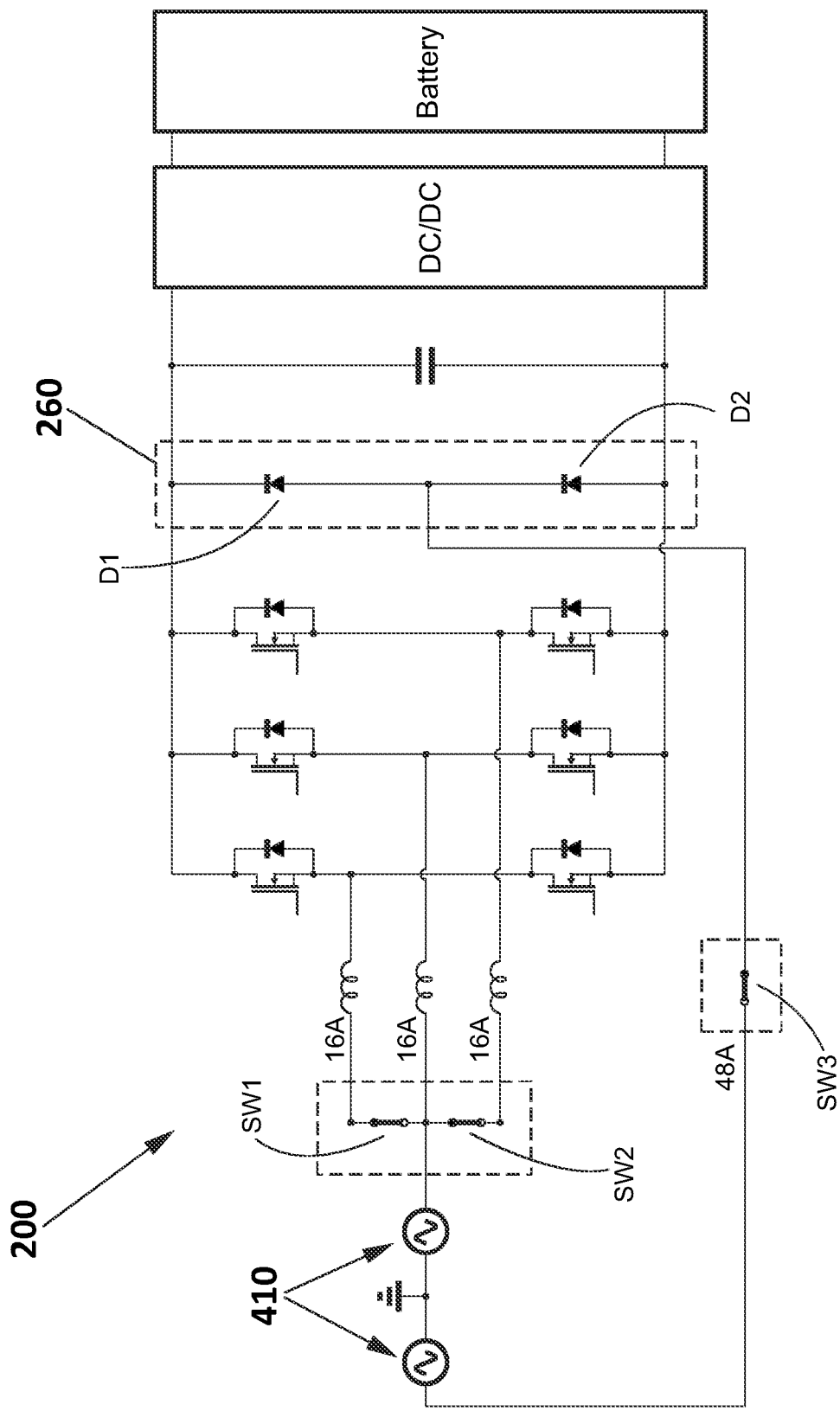
FIG. 4 shows the proposed OBC connected to a split-phase or two phase electrical grid according to the present disclosure.

FIG. 4 shows the OBC (200) described in the previous figures connected to a split-phase or two phase electrical grid (410). This mode of operation is similar to the single phase mode of operation, as can be seen in FIG. 4. The main difference in this mode of operation is related to how the middle point of the diodes arm (260) is connected to the split-phase or two phase electrical grid (410).

Similarly, provided that the phase to neutral grid voltage $V_{rms}$=115$V_{rms}$, so the OBC (200) sees an equivalent input voltage of 230$V_{rms}$, and the line current is $I_{rms}$=48 $A_{rms}$, the maximum power that can be extracted from the grid is $P_{MAX2\emptyset}$=$P_{MAXsplit}$=$P_{MAX3\emptyset}$=11 kW. In split-phase there is a 180° phase shift between phases. Hence, the phase to neutral grid voltage $V_{rms\_L-N}$=115$V_{rms}$. This means that the PFC converter sees 230$V_{rms}$ between the inputs of the PFC converter. Therefore a line current of 48 $A_{rms}$ is required to extract $P_{MAxsplit}$=11 kW from the grid.

For the OBC (200) connected to a two phase grid, having a phase to neutral grid voltage $V_{rms\_L-N}$=230V and a 120° phase shift, the maximum power that can be extracted from the grid is $P_{MAX2\emptyset}$=230$V_{rms}$×√3×16 $A_{rms}$=6.3 kW, and thus, the same maximum current than in the three phase grid operation is maintained. In another example, the maximum power that can be extracted from the grid is $P_{MAX2\emptyset}$= 230$V_{rms}$×√3×32 $A_{rms}$=12.7 kW by applying the current limit of the power components of the PFC stage.

Figure 5:
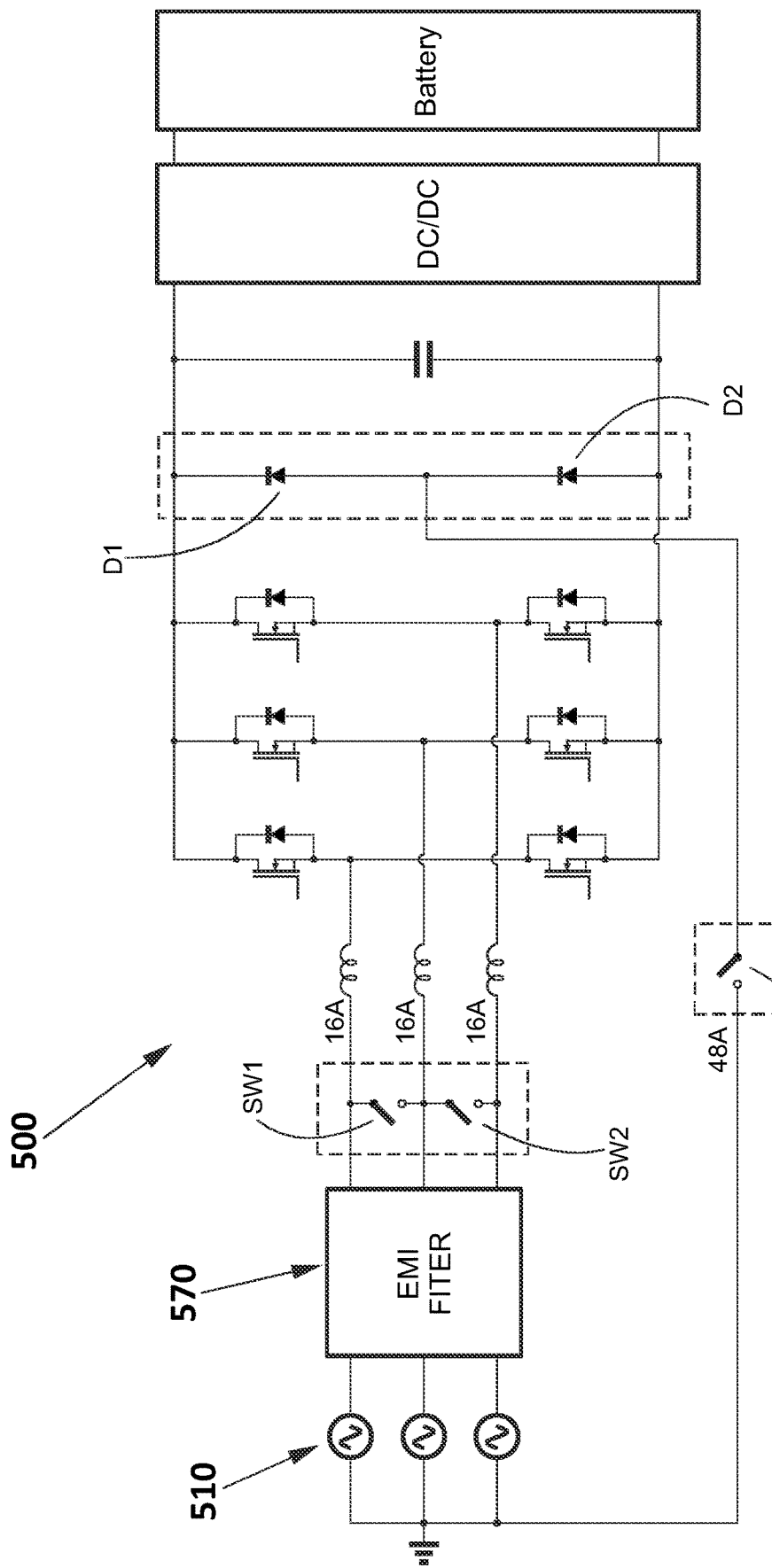
FIGS. 5 and 6 show an example of an OBC with an EMI filter according to the present disclosure.
Figure 6:
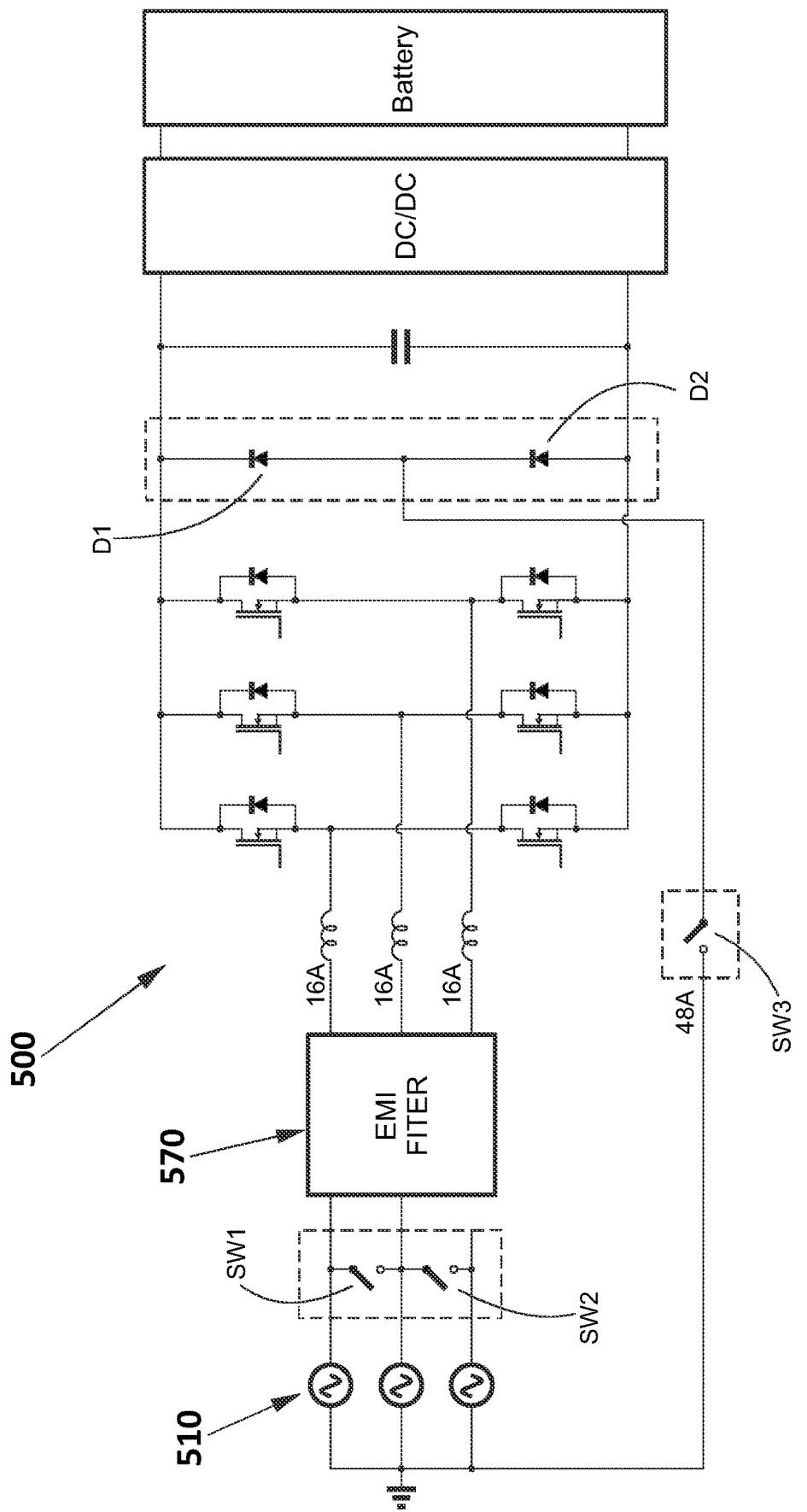

FIGS. 5 and 6 show another example of a proposed OBC (500) according to the present disclosure. The OBC (500) is connected to a three-phase power grid (510) and comprises an EMI filter (570). In particular, EMI refers to electromagnetic interference or propagation disturbance in which radiated or conducted electromagnetic waves affect an electronic devices. Since the OBC (500) is directly connected to an input power source (system power source) which is a power source of the charging control system, the EMI filter (570) may be capable of minimizing inflow of noise generated in the OBC into the system power source. The use of an input EMI filter (570) adds additional degrees of freedom related to the location of the switches SW1 and SW2, as shown in FIG. 5 and FIG. 6.

Figure 7:
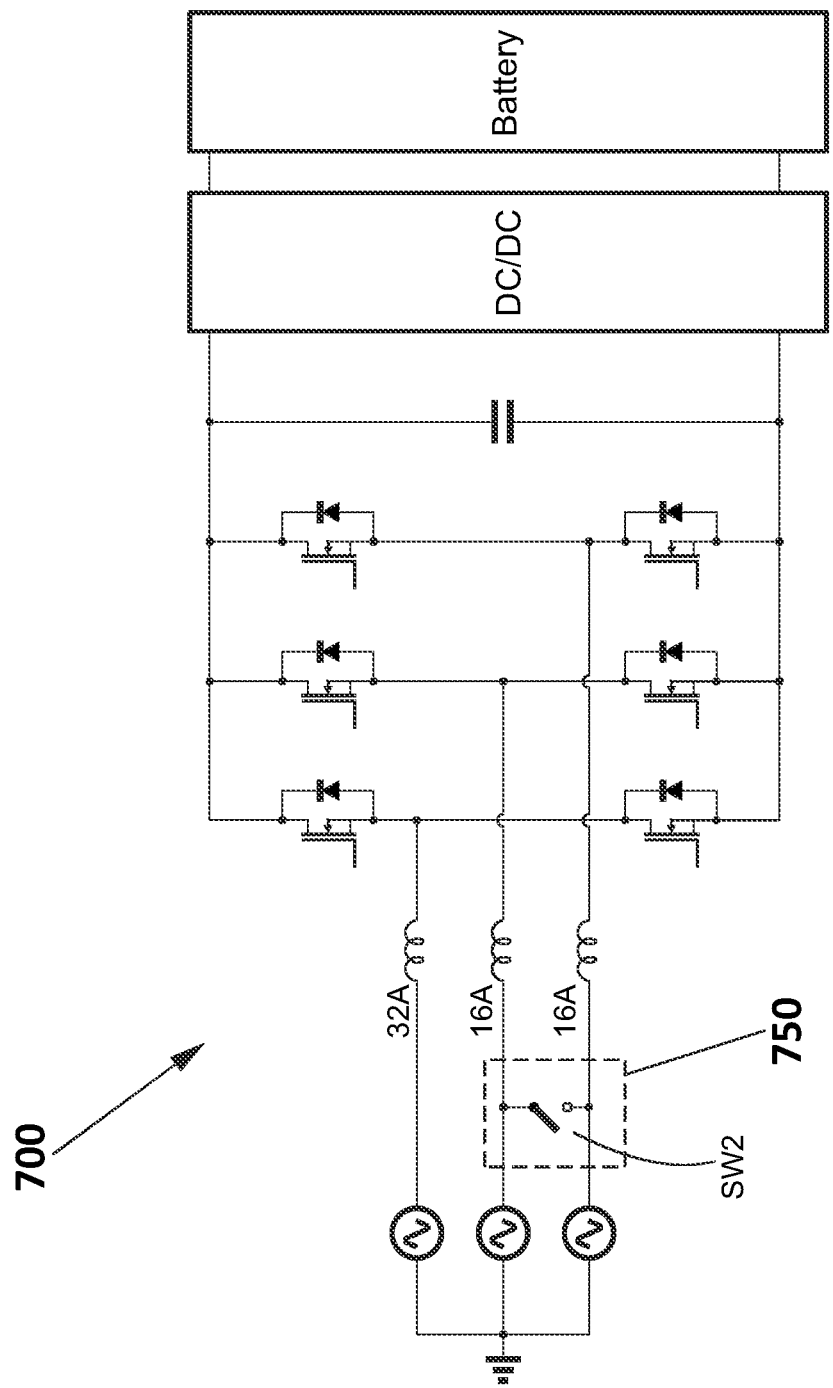
FIGS. 7, 8 and 9 show another example of an OBC for a three phase, single phase, two phase or split-phase grid connection according to the present disclosure.
Figure 8:
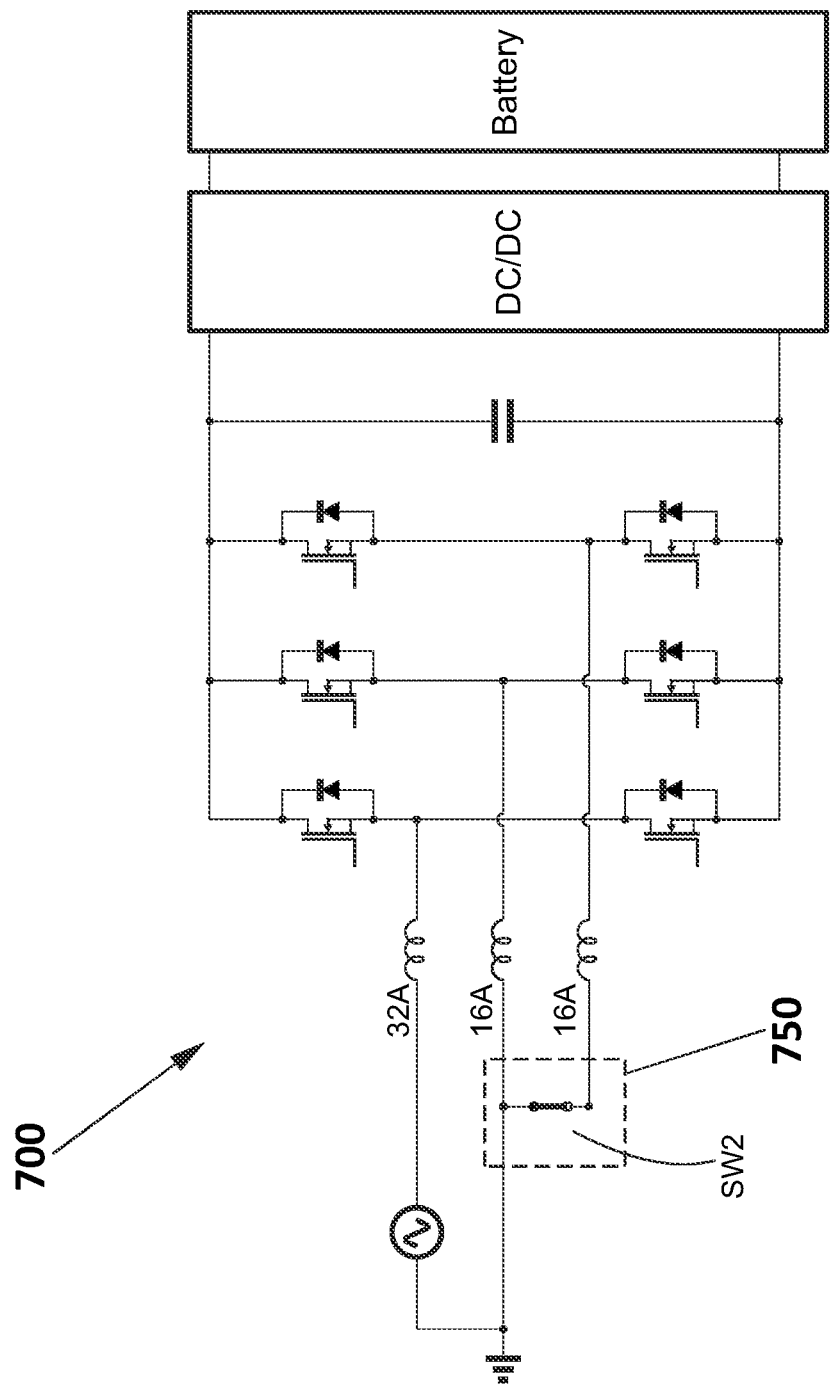
Figure 9:
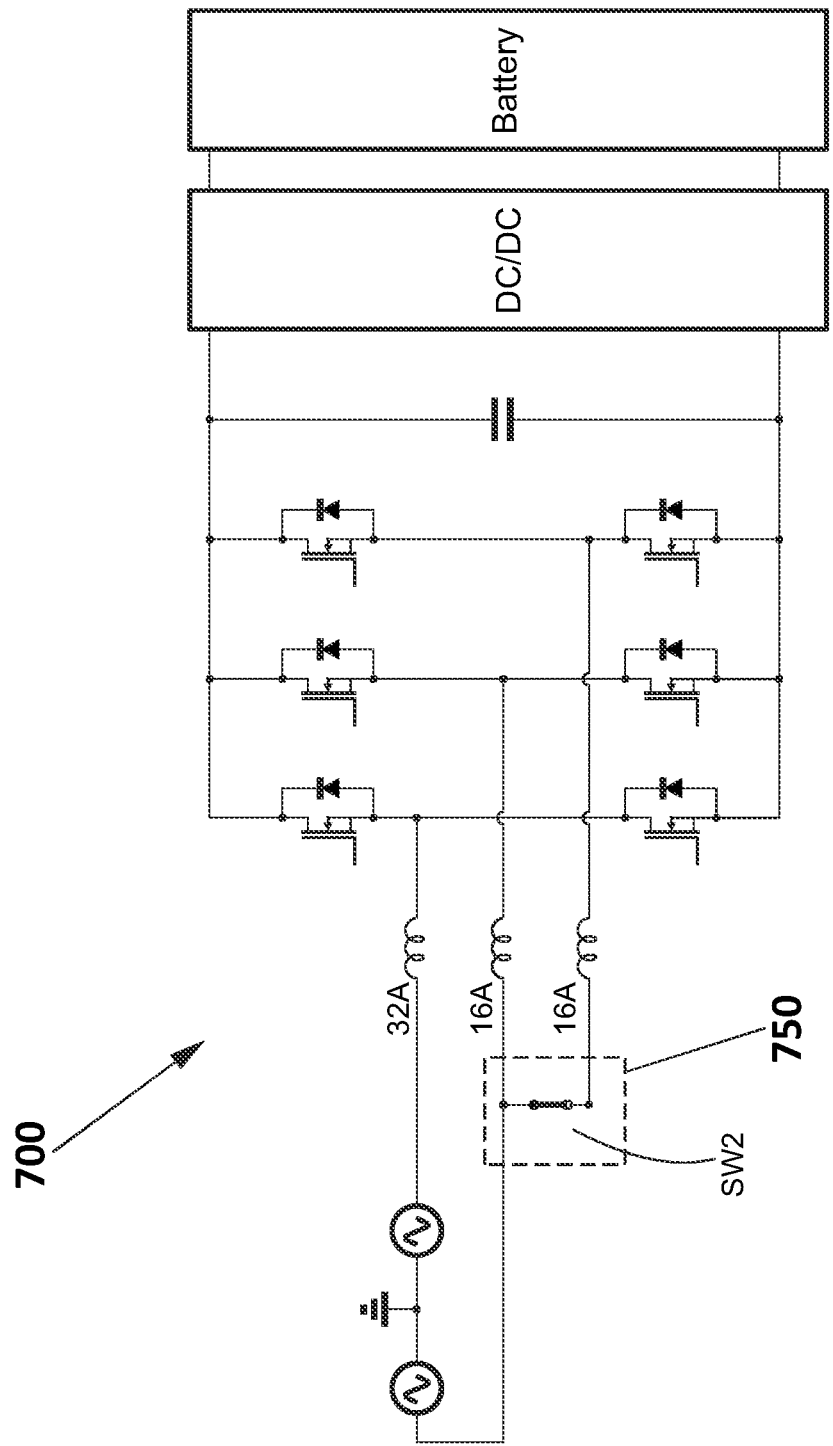

FIGS. 7, 8 and 9 show another example of a proposed OBC (700) according to the present disclosure.

The proposed OBC (700) is shown in FIG. 7 wherein the OBC (700) is connected to a three-phase electrical grid. FIG. 8 and FIG. 9 show the OBC (700) connected to a single-phase and split-phase power grids, respectively. The OBC (700) only comprises a single element, i.e. the switch SW2 with reference (750) to extract a total power from the grid depending on the type of electrical grid to which the OBC (700) is connected. The switch SW2 is arranged between the AFE (220) and the AC electrical grid and can interrupt current flowing between two phase arms of the three phase AFE (220). Hence, with a single switch in close state, the OBC (700) can obtain ⅔ of the maximum power when connected to a single phase electrical grid as shown in FIG. 8 or when connected to a split-phase electrical grid as shown in FIG. 9. Hence, with the proposed OBC (700) connected to a single phase electrical grid as shown in FIG. 8, the maximum power that can be extracted from the grid is $P_{MAX1\emptyset}$=⅔ $P_{MAX3\emptyset}$. Furthermore, with the proposed OBC (700) connected to a split-phase electrical grid as shown in FIG. 9, $P_{MAXsplit}$=⅔ $P_{MAX3\emptyset}$. Furthermore, with the proposed OBC (700) connected to a two-phase electrical grid, $P_{MAX2\emptyset}$=⅔ $P_{MAX3\emptyset}$.

The proposed OBC (700) according to the present disclosure requires that one of the phases is designed to withstand the maximum current $I_{max}$ in the single phase mode of operation, while the other two phases are designed to withstand half of the current. In the single or split-phase or two phase modes of operation, those two phases works in parallel. Different control strategies based on high frequency PWM may be possible, provided that for this example the line current ($I_{rms}$=16 $A_{rms}$) for each arm works in parallel and the $I_{max}$=32 $A_{rms}$. The use of an input EMI filter adds an additional degree of freedom that allows placing the switch SW2 either before or after the EMI filter.

Based on the above, the present disclosure proposes an OBC input stage architecture based on a three phase AFE that allows operating the OBC with single, split, two and three phase electrical grid, ensuring a PF close to unity and low THDi, achieving a high power density while using the minimum number of components and obtaining a total power equal to the maximum power that can be extracted from a three phase grid $P_{MAX3\emptyset}$ in single, split and two phase electrical grids and thus; avoiding the single phase ⅓ limit imposed by the conventional AFE architectures previously mentioned.

Even though reference has been made to a specific embodiment of the invention, it is obvious for a person skilled in the art that the OBC input stage architecture described herein is susceptible to numerous variations and modifications, and that all the details mentioned can be substituted for other technically equivalent ones without departing from the scope of protection defined by the attached claims.

In some examples, the application relates to a first method for extracting a total power which is equal to a maximum power extracted from a three phase electrical grid $P_{MAX3\emptyset}$ from an AC electrical grid with an on-board charger (OBC) that comprises a power factor corrector (PFC) having a three phase active front end (AFE) connected to the AC electrical grid, a DC/DC converter receiving a regulated DC voltage from the PFC and configured to charge a high voltage battery and means that configures the OBC to extract the total power, the means comprises three switches SW1, SW2 and SW3 and a diodes arm having diodes D1 and D2, the first method comprises extracting the total power by actuating the three switches SW1, SW2 and SW3 in an open state that interrupts current responsive to the PFC connected to a three phase electrical grid, wherein the diodes arm does not conduct current, or extracting the total power by actuating the three switches SW1, SW2 and SW3 in a closed state that diverts current responsive to the PFC connected to a single phase electrical grid, wherein the diodes arm conducts current, or extracting the total power by actuating the three switches SW1, SW2 and SW3 in an closed state that diverts current responsive to the PFC connected to a split-phase or a two phase electrical grid, wherein the diodes arm conducts current, and connecting a middle point of the diodes arm to one of the lines of the split-phase or the two phase electrical grid.

In some examples, the first method further comprises establishing an electromagnetic interference (EMI) filter between the AC electrical grid and the three phase AFE.

In some examples, the application relates to a second method for extracting a total power from an AC electrical grid with an on-board charger (OBC) that comprises a power factor corrector (PFC) having a three phase active front end (AFE) connected to the AC electrical grid, a DC/DC converter receiving a regulated DC voltage from the PFC and configured to charge a high voltage battery and a switch SW2 that configures the OBC to extract the total power from the AC electrical grid, the second method comprises extracting the total power equal to a maximum power extracted from a three phase electrical grid $P_{MAX3\emptyset}$ by actuating the switch SW2 in an open state that interrupts current responsive to the PFC connected to the three phase electrical grid, or extracting the total power equal to ⅔ $P_{MAX3\emptyset}$ by actuating the switch SW2 in a closed state that diverts current responsive to the PFC connected to a single phase electrical grid, wherein a first phase arm of the AFE withstands a maximum value of the line current $I_{MAX}$ and a second and third phase arms of the AFE withstand a value of the line current equal to ½ $I_{MAX}$, or extracting the total power equal to ⅔ $P_{MAX3\emptyset}$ by actuating the switch SW2 in a closed state that diverts current responsive to the PFC connected to a split-phase or a two phase electrical grid, wherein a first phase arm of the AFE withstands a maximum value of the line current $I_{MAX}$ and a second and third phase arms of the AFE withstand a value of the line current equal to ½ $I_{MAX}$.

In some examples, the second method further comprising establishing an EMI filter between the AC electrical grid and the three phase AFE.

In some examples, the application also relates to a first an on-board charger (OBC), comprising a power factor corrector (PFC) comprising a three phase active front end (AFE) connected to an AC electrical grid, a DC/DC converter receiving a regulated DC voltage from the PFC and configured to charge a high voltage battery. The OBC is characterized in that it comprises means that configure the OBC to extract a total power which is equal to a maximum power extracted from a three phase electrical grid $P_{MAX3\emptyset}$ from any type of AC electrical grid to which the OBC is connected, the means comprising three switches SW1, SW2 and SW3 and a diodes arm having diodes D1 and D2.

In some examples, the first OBC further comprises an EMI filter established between the electrical grid and the three phase AFE.

In some examples, the application also relates to a second OBC, comprising a power factor corrector (PFC) comprising a three phase active front end (AFE) connected to an AC electrical grid, a DC/DC converter receiving a regulated DC voltage from the PFC and configured to charge a high voltage battery. The OBC is characterized in that it comprises a switch SW2 that configures the OBC to extract a total power from the AC electrical grid to which the OBC is connected, wherein the total power is equal to a maximum power extracted from a three phase electrical grid, $P_{MAX3\emptyset}$, when the AC grid is a three phase electrical grid, wherein the total power is equal to ⅔ $P_{MAX3\emptyset}$ when the AC grid is a single phase, a two phase or a split-phase electrical grid.

In some examples, the second OBC further comprises an EMI filter established between the AC electrical grid and the three phase AFE.

The invention claimed is:

1. A method for extracting a power value which is equal to a rated reference maximum power extracted from a three phase electrical grid $P_{MAX3\emptyset}$ from an AC electrical grid with an on-board charger (OBC) that comprises a power factor corrector (PFC) having a three phase active front end (AFE) connected to the AC electrical grid, a DC/DC converter receiving a regulated DC voltage from the PFC and configured to charge a high voltage battery, the OBC being configured to extract the power value and including three switches SW1, SW2 and SW3 and a diodes arm having diodes D1 and D2 connected in series between a high and low side of the AFE, whereby two switches SW1 and SW2 are arranged between the AFE and the AC electrical grid and are able to interrupt current flowing between phase arms of the three phase AFE, wherein the third switch SW3 is arranged on a line connecting the diodes arm to the AC electrical grid, the method comprising:
   in response to the PFC being connected to a three phase electrical grid, extracting the power value by actuating the three switches SW1, SW2 and SW3 in an open state such that the switches SW1 and SW2 interrupt current flowing between the phase arms of the three phase AFE, wherein the third switch SW3 interrupts current flowing between the three phase electrical grid and the diodes arm, so that the three switches SW1 SW2 and SW3 and the diodes arm do not conduct current;
   in response to the PFC being connected to a single phase electrical grid, extracting the power value by actuating the three switches SW1, SW2 and SW3 in a closed state, wherein the diodes arm conducts current so that the switches SW1 and SW2 allow current to flow between the phase arms of the three phase AFE, wherein the third switch SW3 is closed to allow current to flow between the single phase electrical grid and the diodes arm; and
   in response to the PFC being connected to a split-phase or a two phase electrical grid, extracting the power value by actuating the three switches SW1, SW2 and SW3 in a closed state such that the switches SW1 and SW2 allow current to flow between the phase arms of the three phase AFE, wherein the third switch SW3 is closed to allow current to flow between the diodes arm and one line of the split-phase or the two phase electrical grid.

2. The method of claim 1, further comprising establishing an electromagnetic interference (EMI) filter between the AC electrical grid and the three phase AFE.

3. A method for extracting a power value from an AC electrical grid with an on-board charger (OBC) that comprises a power factor corrector (PFC) having a three phase active front end (AFE) connected to the AC electrical grid, a DC/DC converter receiving a regulated DC voltage from the PFC and configured to charge a high voltage battery and a switch arranged between the AFE and the AC electrical grid and is able to interrupt current flowing between two phase arms of the three phase AFE, the method comprising:
   in response to the PFC being connected to the three phase electric grid, extracting a power value equal to a rated reference maximum power extracted from a three phase electrical grid $P_{MAX3\emptyset}$, by actuating the switch in an open state such that the switch interrupts current flowing between the two phase arms of the three phase AFE;
   in response to the PFC being connected to a single phase electrical grid, extracting the power value equal to a reference ⅔ $P_{MAX3\emptyset}$ by actuating the switch in a closed state such that the switch allows current to flow between the two phase arms of the three phase AFE, wherein a third phase arm of the AFE withstands a maximum value of the line current $I_{MAX}$ and the two phase arms of the three phase AFE withstand a value of the line current equal to ½ $I_{MAX}$; and
   in response to the PFC being connected to a split-phase or a two phase electrical grid, extracting the power equal to a reference ⅔ $P_{MAX3\emptyset}$ by actuating the switch in a closed state such that the switch allows current to flow between the two phase arms of the three phase AFE, wherein the third phase arm of the three phase AFE withstands a maximum value of the line current $I_{MAX}$ and the two phase arms of the AFE withstand a value of the line current equal to ½ $I_{MAX}$.

4. The method of claim 3, further comprising establishing an electromagnetic interference (EMI) filter between the AC electrical grid and the three phase AFE.

5. An on-board charger (OBC), comprising:
a power factor corrector (PFC) comprising a three phase active front end (AFE) connected to an AC electrical grid;
a DC/DC converter receiving a regulated DC voltage from the PFC and configured to charge a high voltage battery;
the OBC being configured to extract a power value which is equal to a rated reference maximum power extracted from a three phase electrical grid $P_{MAX3\phi}$ from any type of AC electrical grid to which the OBC is connected, the OBC comprising three switches SW1, SW2 and SW3 and a diodes arm having diodes D1 and D2 connected in series between a high and low side of the AFE, whereby two switches SW1 and SW2 are arranged between the AFE and the AC electrical grid and are able to interrupt current flowing between phase arms of the three phase AFE, wherein the third switch SW3 is arranged on a line connecting the diodes arm and the AC electrical grid;
wherein in response to the AFE of the PFC being connected to a three phase electrical grid, the three switches SW1, SW2, SW3 are actuated to an open state such that switches SW1 and SE2 interrupt current flowing between the phrase arms of the three phase AFE, wherein the third switch SW3 interrupts current flowing between the three phase electrical grid and the diodes arms, so that the three switches SW1, SW2, SW3 and the diodes arm do not conduct current;
wherein in response to the AFE of the PFC being connected to a single phase electrical grid, the three switches SW1, SW2, SW3 are actuated to a closed state, wherein the diodes arm conducts current so that the switches SW1 and SW2 allow current to flow between the phase arms of the three phase AFE, wherein the third switch SW3 is closed to allow current to flow between the single phase electrical grid and the diodes arm; and
wherein in response to the AFE of the PFC being connected to a split-phase or a two phase electrical grid, the three switches SW1, SW2, SW3 are actuated to a closed state such that the switches SW1 and SW2 allow current to flow between the phase arms of the three phase AFE, wherein the third switch SW3 is closed to allow current to flow between the diodes arm and one line of the split-phase or the two phase electrical grid.

6. The OBC of claim 5, further comprising an electromagnetic interference (EMI) filter established between the electrical grid and the three phase AFE.

7. The OBC of claim 5, wherein the diodes D1 and D2 comprise line frequency diodes.

8. An on-board charger (OBC), comprising:
a power factor corrector (PFC) comprising a three phase active front end (AFE) connected to an AC electrical grid; and
a DC/DC converter receiving a regulated DC voltage from the PFC and configured to charge a high voltage battery;
a switch arranged between the AFE and the AC electrical grid that is able to interrupt current flowing between two phase arms of the three phase AFE;
wherein the power value is equal to a rated reference maximum power extracted from a three phase electrical grid, $P_{MAX3\phi}$ when the AC grid is a three phase electrical grid by actuating the switch in an open state in response to the PFC connected to the three phase electrical grid so that the switch interrupts current flowing between the two phase arms of the three phase AFE; and
wherein the power value is equal to a reference $\frac{2}{3}$ $P_{MAX3\phi}$ when the AC grid is a single phase and a two phase or a split-phase electrical grid so that the switch allows current to flow between the two phase arms of the three phase AFE, wherein a third phase arm of the three phase AFE withstands a maximum value of the line current $I_{MAX}$ and the two phase arms of the AFE withstand a value of the line current equal to $\frac{1}{2}$ $I_{MAX}$.

9. The OBC of claim 8, further comprising an electromagnetic interference (EMI) filter established between the AC electrical grid and the three phase AFE.

* * * * *